United States Patent [19]
Muller

[11] 3,782,549
[45] Jan. 1, 1974

[54] FILTER AND AERATOR DEVICE

[76] Inventor: Jacques Muller, 112 Avenue du Genl. de Gaulle, La Garenne-Colombes, France

[22] Filed: Oct. 24, 1972

[21] Appl. No.: 300,195

[30] Foreign Application Priority Data
Nov. 4, 1971 France .............................. 7139476

[52] U.S. Cl. ................ 210/95, 210/282, 210/317, 210/449, 210/460, 210/464, 210/488, 261/78 A
[51] Int. Cl. ............................................. C02c 1/14
[58] Field of Search ................. 210/94, 95, 209, 210/266, 315, 317, 449, 461, 463, 464, 468, 469, 488, 282; 261/78 A

[56] References Cited
UNITED STATES PATENTS

| | | | |
|---|---|---|---|
| 3,679,054 | 7/1972 | Muller | 210/488 X |
| 3,204,770 | 9/1965 | Brink | 210/449 X |
| 2,807,368 | 9/1957 | Blau | 210/463 |
| 2,643,104 | 6/1953 | Holden | 210/449 X |
| 2,063,778 | 12/1936 | Andrus | 210/449 X |
| 1,677,892 | 7/1928 | Herbert et al. | 210/488 |

Primary Examiner—Samih N. Zaharna
Assistant Examiner—Robert H. Spitzer
Attorney—Arthur B. Colvin

[57] ABSTRACT

The invention relates to a filtering and aerating device comprising a filter cartridge formed by a stack of grooved washers positioned in a chamber for flow of water through the stack of washers and out of the outlet of the device. The outlet has an associated port for entry of air into the filtered jet of water to aerate the latter. The chamber in which the stack is positioned is designed to contain a deodorizing and purifying substance to remove odors from the water and the inlet of the device is adapted to be removably connected to a source of water, such as to the neck of a bottle, for example, an air entry tube extending axially through the unit having one end positioned in the bottle and its other end in connection with the exterior to permit free flow of water through the unit when the bottle is inverted.

8 Claims, 3 Drawing Figures

PATENTED JAN 1 1974　　　　　　　　　　　　　　3,782,549
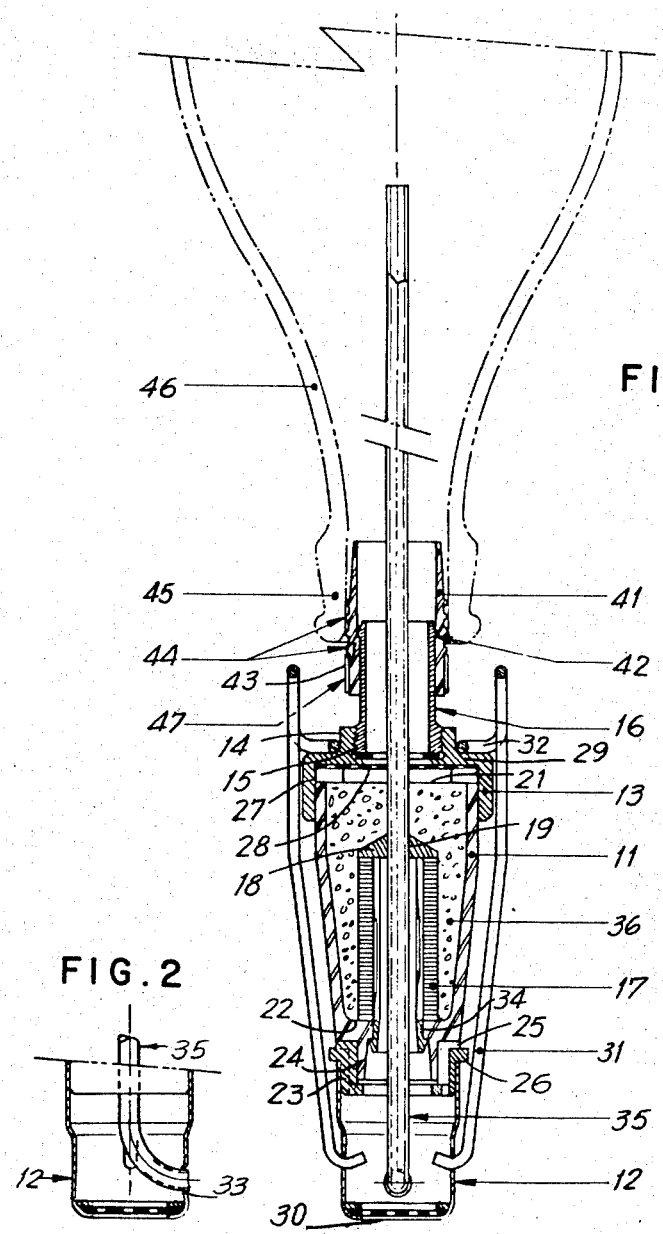
FIG.1
FIG.2
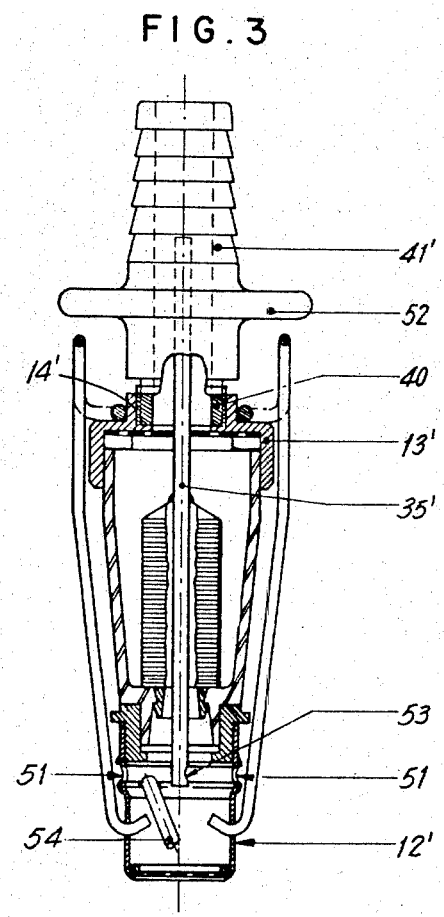
FIG.3

FILTER AND AERATOR DEVICE

As conducive to an understanding of the invention, it is noted that in many localities the available water supply contains chemicals that cause a disagreeable odor and taste. As a result, in the absence of piped water such as is the case in camps or on isolated farms, the water from wells or cisterns must be used.

It is accordingly among the objects of the invention to provide a water filtering and aerating device which is relatively simple in construction and may readily be disassembled for replacement of its parts, which incorporates a filter cartridge to remove impurities and particles from the water passing therethrough and which has an associated chamber emcompassing the filter cartridge in which a deodorizing substance may be positioned to remove undesirable odors from the water when device may readily be releasably connected to the outlet of a water supply and particularly to the neck of a bottle, and which has means to permit ready flow of water through the unit when the bottle is inverted.

According to the invention, these objects are accomplished by the arrangement and combination of elements hereinafter described, and more particularly recited in the claims.

In the accompanying drawings in which are shown one or more of various possible embodiments of the several features of the invention.

FIG. 1 is a longitudinal sectional view of the device adapted to be connected to the neck of the bottle.

FIG. 2 is a detail sectional view showing the air entry tube; and

FIG. 3 is a view similar to FIG. 1 of another embodiment of the invention.

Referring now to the drawings, the device is of the general type shown in U.S. Pat. No. 3,679,054 and comprises a hollow body 11 substantially frusto-conical in shape and of larger diameter at its upper end. Ferrule 12 is positioned at the lower end of the hollow body 11 and a cup shaped connecting member 13 is positioned at the upper end of the hollow body with the side wall of the connecting member encompassing such upper end. The connecting member 13 has an axial bore with an upwardly extending annular flange 14 internally threaded as at 15.

A rigid tubular member 16 in the form of a sleeve for example, has one end screwed with the internally threaded flange 14.

Positioned in the hollow body 11 and extending axially thereof is a filtering cartridge 17 which consists of a stack of washers each having radiating grooves extending from the outer periphery of each washer to a central opening in each washer, said central opening when the washers are assembled defining an axial passageway through which water may flow.

More specifically the passageway is closed at its upper end by a plug 18 which has an axial bore 19 and is open at its lower end.

The hollow body 11 preferably is formed of a transparent material such as plastic or glass being open as at 21 at its upper end and defining a shoulder 22 near its lower end which supports the axial filter cartridge or stack 17.

A ring 23 encompasses the reduced diameter portion 24 of the hollow body 11 which defines the outlet of liquid from the hollow body 11, said ring having a plurality of air inlets 25 arranged in its circumference leading from the exterior of the unit into the interior of the ferrule 12, the latter being of greater diameter at its upper portion which encompasses the ring and abuts against the annular flange 26 thereof, said enlarged diameter upper portion of the ferrule facilitating the suction of air from the exterior into the liquid passing through the ferrule.

A washer 27 is positioned in the cup-shaped connecting member 13 resting on the upper end of the hollow body 11, said washer supporting a fine mesh screen 28 positioned between said washer and the top wall 29 of the connecting member 13. A fine mesh screen 30 is also positioned against the internal lower end of the ferrule to cover the opening therethrough.

The elements above described are retained in assembled position by means of a stirrup 31, the cross piece 32 at the upper end thereof reacting against the top wall of the cup-shaped connecting member 13, the lower ends of the legs of said stirrup 31 being hooked into the ferrule.

Extending substantially laterally into the ferrule 12 from an air inlet port 33 and then rising vertically through a bushing 34 secured in an axial bore in the lower end of the hollow body 11 is an air inlet tube 35. The tube 35 extends through the cartridge 17; through the bore 19 in plug 18 and through the sleeve 16, protruding beyond the latter.

As shown in FIG. 1, the portion of the hollow body 11 encompassing the filter cartridge 17 is spaced therefrom to define an annular chamber 36 for suitable deodorizing and purifying material may be inserted into the unit by removing the stirrup 31 to disengage the body 11.

As shown in FIG. 1, a flexible connection in the form of a rubber sleeve 41 is forced over the end of the rigid sleeve 16, the latter having an outwardly extending annular bead 42 at its outer end against which the internal annular shoulder 43 of the sleeve 41 may abut. The flexible sleeve 41 has a plurality of spaced annular ribs 44 on its outer periphery which prevents leakage from the neck 45 of a bottle 46 into which the sleeve 41 is forced. Preferably, the sleeve 41 tapers inwardly toward its outer end to facilitate its insertion into different diameter bottle necks.

To secure the sleeve 41 in place, it is desirably encompassed by a rigid metal ring 47.

It is to be noted that the tube 35 is of length such that when the flexible sleeve 41 is forced into the neck 45 of the bottle 46, the tube 35 will extend a substantial distance into the bottle.

The embodiment shown in FIG. 3 is similar to the embodiment of FIG. 1 and corresponding elements have the same elements primed.

Referring to FIG. 3, the ferrule 12' has a plurality of aligned ports 51 circumferentially spaced around the periphery thereof. The flexible connector 41' has a cylindrical extension 40 which is externally threaded to screw directly into the internally threaded annular flange 14', the connector having a collar 52 to facilitate grasping thereof.

The air inlet tube 35' terminates at its lower end in the ferrule 12' substantially aligned with the ports 51, said lower end being plugged. The side wall of such lower end has an aperture 53 which permits venting of the bottle (not shown) to which the connector is secured, for flow of liquid.

In addition, a small tube 54 is connected at one end to one of the ports 51 and has its other end extending to the axis of the ferrule and directed downward to aerate the liquid flowing through the ferrule.

With the constructions above described, it is apparent that different size flexible connectors may be used so as to fit into or encompass different size necks of bottles or nipples or outlets of containers.

By reason of the air tubes which extend into the bottle, the interior thereof will be vented to permit ready flow through the device with resultant removal of impurities by reason of the filter cartridge and deodorfication by reason of the chemicals in the chamber 36.

Having thus described my invention, what I claim as new and desire to secure by Letters Patents of the United States is:

1. A filtering and aerating device comprising a hollow body having an inlet at one end and an outlet at the other end, means for connecting the inlet to a liquid container, a filter cartridge positioned in said hollow body and extending axially thereof, said hollow body encompassing said cartridge and being spaced therefrom to define a chamber, said filter cartridge comprising a stack of juxtaposed washers each having radiating grooves on at least one surface thereof and a central opening therein, said openings defining a central passageway closed at its upper end adjacent the inlet, said closed end having an axial bore, said passageway being open at its other end, said passageway serving as a path through which liquid may flow from the inlet into said hollow body and through said grooves into said passageway to the outlet, an air entry tube extending axially through said axial bore and protruding at one end beyond said inlet, the other end of the tube being in communication with the exterior adjacent said outlet, and a plurality of air inlet ports adjacent said outlet for admission of air from the exterior into the stream of water passing through said outlet.

2. The combination set forth in claim 1 in which said inlet has a flexible connecting sleeve associated therewith.

3. The combination set forth in claim 2 in which said sleeve has a plurality of spaced annular ribs on its outer periphery to provide a liquid-tight seal with respect to the neck of a bottle into which it is inserted.

4. The combination set forth in claim 1 in which said chamber has a charge of granulated deodorizing chemicals therein.

5. The combination set forth in claim 1 in which said hollow body comprises a central portion in the form of a frustoconical member of transparent material, a cup-shaped connecting member positioned on one end of said central portion, a hollow ferrule positioned on the other end of said central portion, a retaining stirrup having a cross member resting against said cup-shaped connecting member and having the ends of its legs detachably connected to said ferrule, said ferrule having a port in its side wall, the other end of said air entry tube being connected to said port.

6. The combination set forth in claim 5 in which said central member has a reduced diameter portion at its lower end, a ring encompasses said reduced diameter portion, said ring having a plurality of circumferentially spaced air passageways therethrough, said ferrule encompassing said ring.

7. The combination set forth in claim 1 which said hollow body comprises a central portion in the form of a frusto-conical member of transparent material, a cup-shaped connecting member positioned on one end of said central portion, a hollow ferrule positioned on the other end of said central portion, a retaining stirrup having a cross member resting against said cup-shaped connecting member and having the ends of its legs detachably connected to said ferrule, said ferrule having a plurality of circumferentially spaced ports in its side wall, the other end of said air entry tube extending into said ferrule, said other end being plugged at its extremity and having an opening in its side wall substantially aligned with said circumferentially spaced ports.

8. The combination set forth in claim 7 in which an additional tube is positioned in said ferrule, one end of said additional tube being connected to one of said circumferentially spaced ports and the other end of said tube extending axially downward in said ferrule.

* * * * *